(12) United States Patent
Goldstein

(10) Patent No.: US 6,923,394 B2
(45) Date of Patent: Aug. 2, 2005

(54) REELING DEVICE FOR A HOISTING SYSTEM

(75) Inventor: Michael Goldstein, Bat-Yam (IL)

(73) Assignee: MAG-EH LTD (IL)

( * ) Notice: Subject to any disclaimer, the term of this patent is extended or adjusted under 35 U.S.C. 154(b) by 0 days.

(21) Appl. No.: 10/412,809

(22) Filed: Apr. 11, 2003

(65) Prior Publication Data

US 2004/0075007 A1 Apr. 22, 2004

(30) Foreign Application Priority Data

Apr. 11, 2002 (IL) ................................................ 149079

(51) Int. Cl.[7] .................................................. B66D 1/00
(52) U.S. Cl. ........................ 242/323; 254/375; 414/463; 414/466; 224/42.21; 224/42.23; 224/42.29
(58) Field of Search ................................. 254/270, 276, 254/323, 340, 345, 365, 375; 414/463, 466; 224/42.21, 42.23, 42.39

(56) References Cited

U.S. PATENT DOCUMENTS

| | | | | | |
|---|---|---|---|---|---|
| 2,053,976 | A | * | 9/1936 | Stahl | 254/375 |
| 4,997,164 | A | * | 3/1991 | Kito et al. | 254/323 |
| 5,125,628 | A | * | 6/1992 | Rempinski et al. | 254/323 |
| 5,415,377 | A | * | 5/1995 | Britt et al. | 254/323 |
| 6,299,403 | B1 | * | 10/2001 | Lee | 414/463 |
| 6,554,253 | B1 | * | 4/2003 | Dobmeier et al. | 254/323 |

* cited by examiner

Primary Examiner—Emmanuel Marcelo
(74) Attorney, Agent, or Firm—Gordon & Rees LLP

(57) ABSTRACT

The invention provides a reeling device for a hoisting system, including a flexible member having a lower end and an upper end, a rotatable drum on which the flexible member is windable, disk means rotatably mounted on said drum, to which disk means the upper end of the flexible member is anchored, and a stop mechanism activated by the disk means once the flexible member has completely unreeled from the drum.

8 Claims, 4 Drawing Sheets

REELING DEVICE FOR A HOISTING SYSTEM

FIELD OF THE INVENTION

The present invention relates to a reeling device for use with a hoisting system, in particular, for an underbody hoist system for securing a motor vehicle spare tire against the underside of a motor vehicle body.

BACKGROUND OF THE INVENTION

Spare tires for vehicles are heavy and bulky objects that, in many vehicles, are accommodated below the vehicle body and are secured against the bottom of the vehicle or against a structure carried by elements of the vehicle chassis. Because of their weight and size, vehicle spare tires can rarely be lowered to the ground, or raised for storage, by hand. For this reason, vehicles with heavier tires are provided with hoisting devices such as winches, by means of which the spare tire is lowered or raised using a steel cable. Upon lowering the spare tire, the cable may reach its fully unwound state. Should the drum continue to be turned in the original sense, the cable would start to wind back on the drum of the hoist in the opposite direction, and the load would be unintentionally raised. It would therefore be advantageous to provide a device that, in the case of a fully unwound cable, would prevent the load from being raised unintentionally. State of the art devices, are relatively complicated to manufacture and comprise many parts. Moreover, the braking action is based on a local tight curve along the cable, eventually causing premature wearing of the cable. Furthermore, in these devices, the brake mechanism is almost entirely located inside the drum, which may lead to functional difficulties.

DISCLOSURE OF THE INVENTION

It is thus one of the objects of the present invention to overcome the shortcomings of prior art devices and to provide an improved, simpler, less expensive, safer and more practical solution to the above-described problems.

The invention therefore provides a reeling device for a hoisting system, comprising a flexible member having a lower end and an upper end; a rotatable drum on which the flexible member is windable; disk means rotatably mounted on the drum, to which disk means the upper end of the flexible member is anchored, and a stop mechanism activated by the disk means once the flexible member has completely unreeled from the drum.

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the Drawings:

FIG. 1 is a schematic illustration of a preferred embodiment of the invention, showing the lowering of a load and a flexible member approaching its fully unwound state;

FIG. 2 is similar to FIG. 1, but showing the flexible member having just reached its fully unwound state;

FIG. 3 is similar to FIG. 2, with the drum having been rotated a little further, thereby activating the stop mechanism;

FIG. 4 is an exploded view of the flexible member drum;

FIG. 5 is an exploded view of a section of the device, and

FIG. 6 is an exploded view of the entire device.

DETAILED DESCRIPTION

Figure 1:
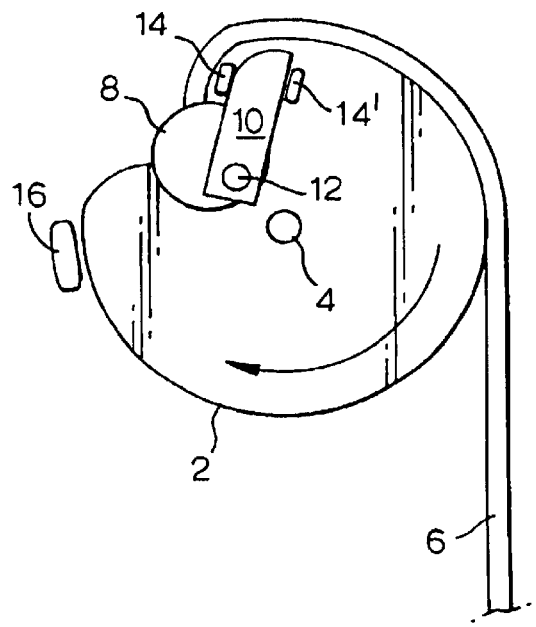

Referring now to the drawings, there is shown in FIG. 1 a schematic illustration of a preferred embodiment of the invention. Seen is a drum 2 rotatably mounted on pivot 4 and having a flexible member, e.g., a chain or a cable 6 partly wound around it. The upper end of the cable is attached to a disk 8, rotatably mounted in drum 2 and coupled with the movable latch 10 of a stop mechanism by means of an eccentric pivot 12. The motion of latch 10 is constrained to a substantially linear motion by means of two projections 14, 14' that are affixedly attached to drum 2. The stationary stop 16 of the stop mechanism is a part of one of the brackets enclosing the device (not shown).

Figure 2:
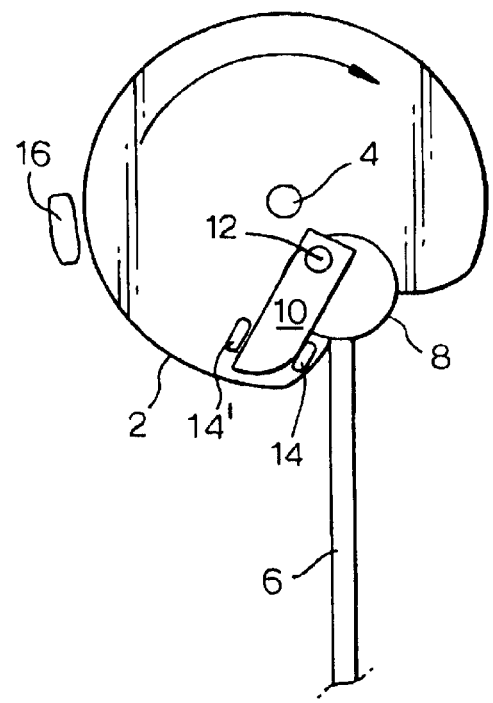
Figure 3:
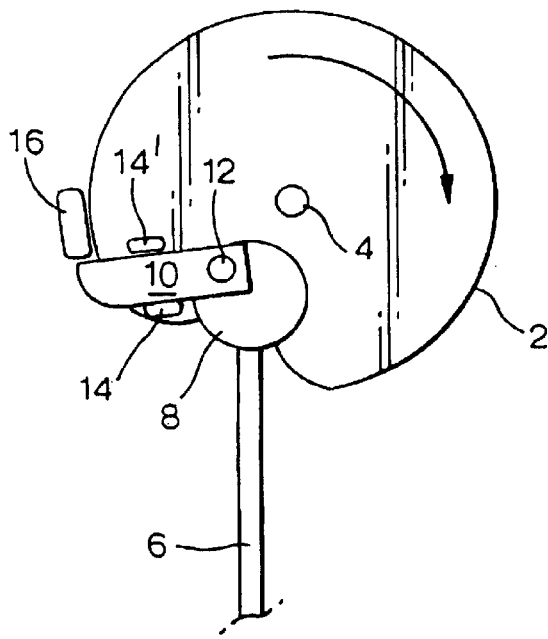

Should drum 2 be rotated clockwise around pivot 4, cable 6 will soon reach the fully unwound state illustrated in FIG. 2. Further clockwise rotation of the drum 2 will bring the device to the state represented in FIG. 3. FIG. 3 shows the device following further clockwise rotation of drum 2 from the state shown in FIG. 2, causing cable 6 to change its angle relative to the radius of drum 2 and consequently, to rotate disk 8 relative to the drum. Thereby, the position of eccentric pivot 12 has changed relative to drum 2, pushing movable latch 10 of the stop mechanism leftward to be intercepted by stop 16. Thus, further clockwise rotation of drum 2 and consequent unintentional rewinding of cable 6 are prevented.

Figure 4:
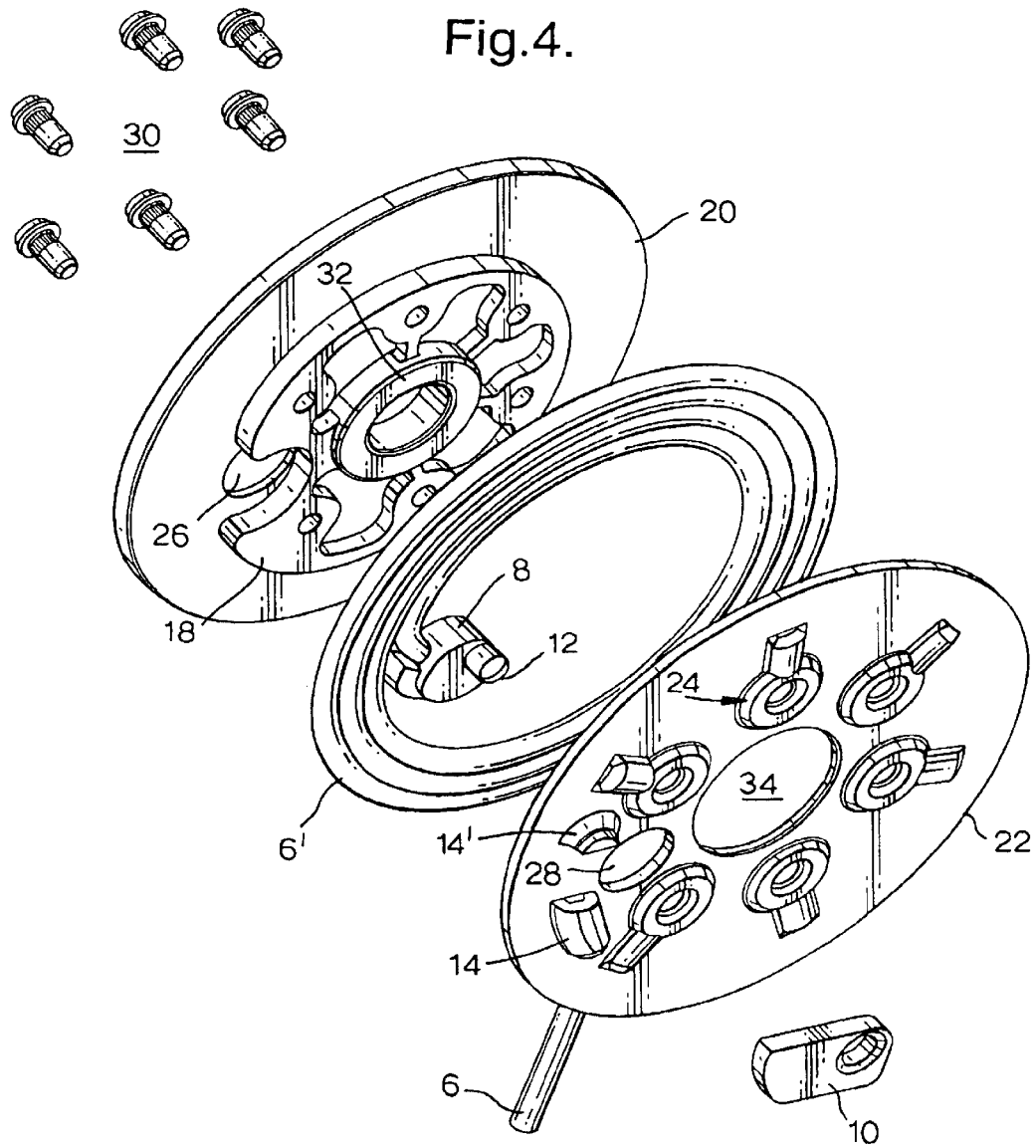

The exploded view of the drum, shown in FIG. 4, shows a drum core 18, of a width determined by the thickness of cable 6, having peripheral flange 20, advantageously a one-piece aluminum casting. Disk 8, having eccentric pivot 12, is preferably injection molded, with the splayed end of cable 6 inserted into the mold prior to the casting for permanent anchoring. Further shown is an end plate 22, having stamped-out guide projections 14, 14' used to constrain latch 10 to a linear motion. End plate 22 is entirely stamped out from steel sheet, including reinforcement features 24. Further shown is the cable 6, having a straight portion and a wound portion 6'. Latch 10 is also stamped from steel sheet. Flange 20 is provided with a cylindrical recess 26, which accommodates one side of disk 8, and end plate 22 has a circular opening 28 for receiving the other side of disk 8. Recess 26 and opening 28 serve as bearings for disk 8. In its assembled form, the drum components are secured together by six rivets 30, defining between themselves an annular space for a plurality of turns of cable 6' with hub 32 of drum core 18 fitting hole 34. Pivot 12 projects through opening 28, thus enabling latch 10 to rotatably couple with it. Latch 10 and pivot 12 are prevented from accidental separation by riveting the tip of pivot 12.

Figure 5:
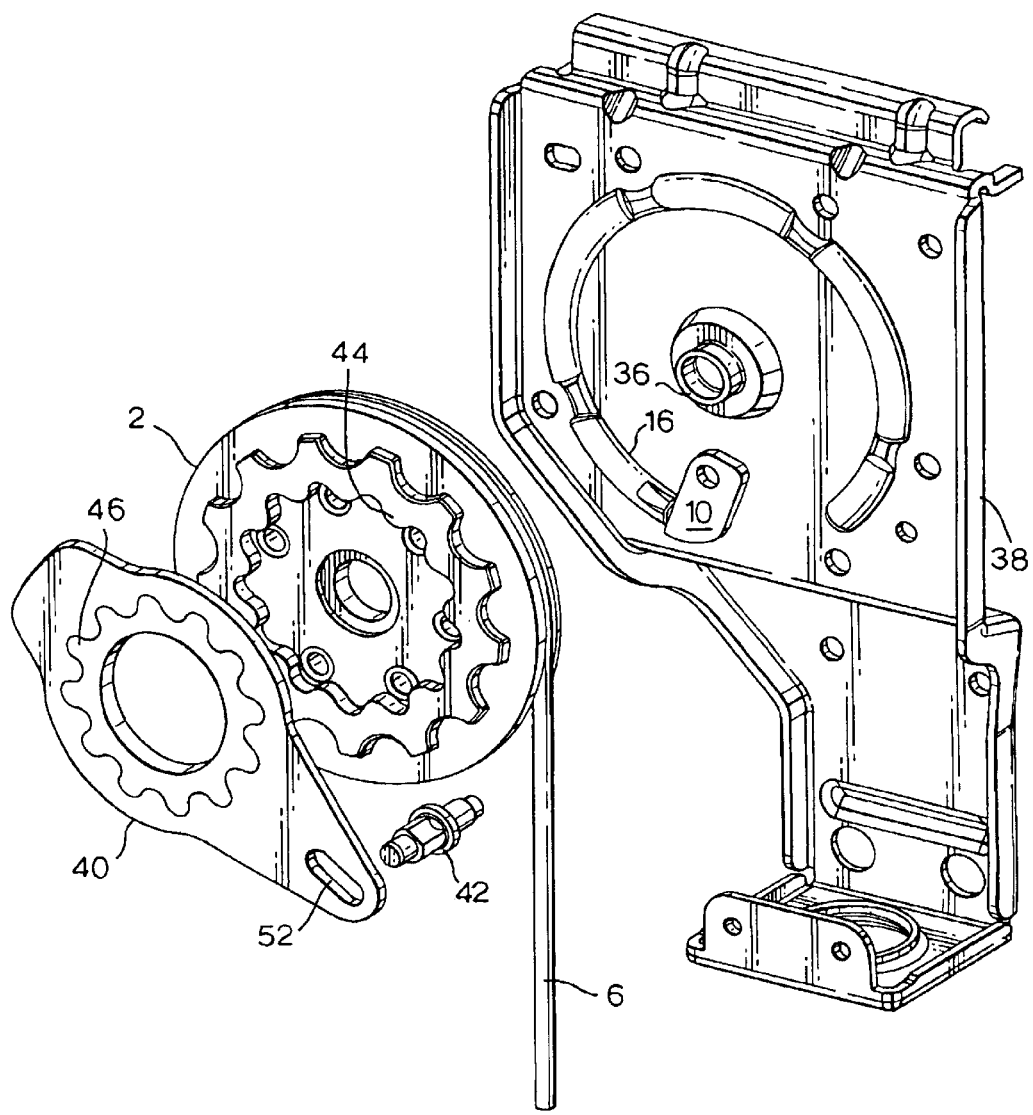
Figure 6:
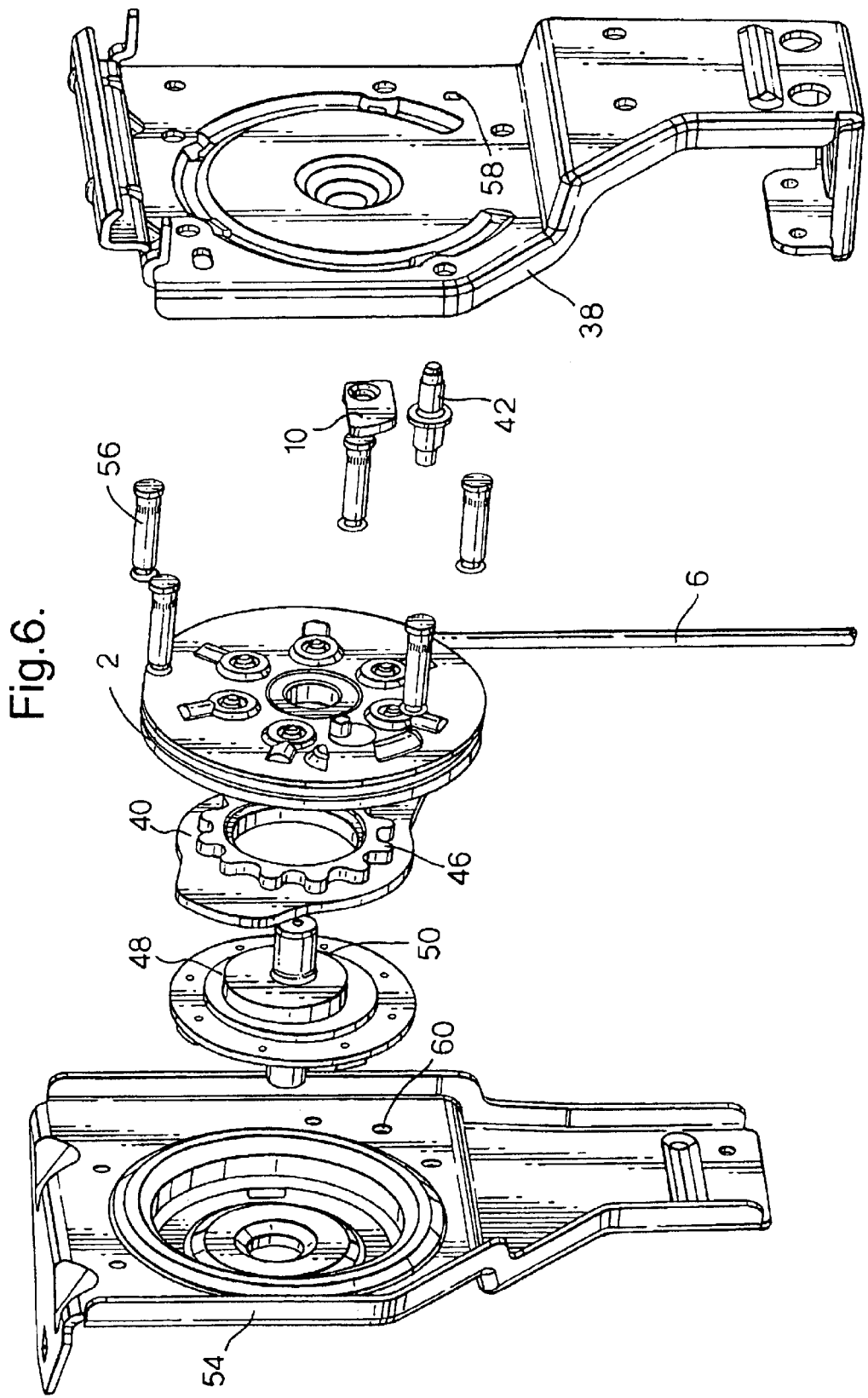

The exploded view of a section of the device of the present invention, shown in FIG. 5, depicts in detail assembled drum 2, pivot 36 around which it revolves, cable 6 and latch 10 of the stop mechanism. Further seen are the stationary stop 16, main bracket 38 from which stop 16 is stamped out, and some parts of lever 40 and pin 42 of the reduction gear that is used to rotate drum 2. Another component of the reduction gear is an internal gear 44, advantageously an integral part of drum 2 (FIG. 5). The reduction gear, known as "wobble gear," comprises an external gear 46 fixedly attached to lever 40 and schematically indicated by a thin line in FIG. 5, and seen in its real shape in FIG. 6. It has less teeth than internal gear 44, e.g., 12 teeth as compared to the 13 teeth of internal gear 44. When lever 40 is set wobbling by an eccentric 48 mounted on a shaft 50 (FIG. 6) manually rotatable by means of a crank, lever 40, restrained by pin 42 seated in the elongated hole 52 (FIG. 5), causes external gear 46 to roll off internal gear 44. Because of the difference in the number of teeth (13 compared to 12), the ratio of reduction will be 13:1. In the assembled state, pin 42 can accommodate the wobbling motion of lever 40 by freely swivelling in holes 58, 60 in brackets 38 and 54, respectively. The entire device is held together by fasteners 56.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A reeling device for a hoisting system, comprising:
   a flexible member having a lower end and an upper end;
   a rotatable drum on which said flexible member is windable;
   disk means rotatably mounted on said drum, to which disk means said upper end of the flexible member is anchored;
   a stop mechanism located externally to said drum and activated by said disk means; and
   said store mechanism including a pivot eccentrically disposed on said disk means.

2. The device as claimed in claim 1, wherein said drum is rotatably mounted between a first and a second bracket.

3. The device as claimed in claim 1, wherein said drum comprises a peripheral flange and an end plate fixedly attached to the drum, said end plate defining, with said flange, an annular space for a plurality of turns of the flexible member.

4. The device as claimed in claim 3, wherein said stop mechanism is located externally to said annular space.

5. The device as claimed in claim 1, wherein a latch is rotatably mounted on said eccentric pivot, said latch being adapted to move relative to said end plate along a substantially straight line between outer and inner limit positions, depending on the angular position of said disk means relative to said drum.

6. The device as claimed in claim 5, wherein said latch is constrained to said straight line movement by two guide projections integral with, or attached to, said end plate.

7. The device as claimed in claim 5, wherein, in its outer limit position, said latch is intercepted and stopped by stop means integral with, or attached to, said first bracket.

8. The device as claimed in claim 1, wherein said drum is rotatable via a reduction gear.

* * * * *